UNITED STATES PATENT OFFICE.

FELIX R. LANIER, OF MEMPHIS, TENNESSEE.

PRESERVING COTTON-SEED AND COTTON-SEED OIL.

SPECIFICATION forming part of Letters Patent No. 241,030, dated May 3, 1881.

Application filed October 6, 1880. (Specimens.)

*To all whom it may concern:*

Be it known that I, FELIX R. LANIER, of the city of Memphis, Shelby county, Tennessee, have invented an Improved Process for Preserving Cotton-Seed Kernels, Cotton-Seed Oil-Cake, and Oil-Cake Meal for Shipment and other Purposes, of which the following is a specification.

Fill a cask or other vessel with cotton-seed kernels, cotton-seed oil-cake, or oil-cake meal. Let the cask or vessel be full without packing or pressing. Then pour into the cask or vessel sufficient quantity of cotton-seed oil to fill all space between the particles. Make the cask or vessel oil-tight, and the mixture can be safely shipped any distance across land or sea without being injured or spoiled. When the mixture arrives at its destination the oil can be pressed out and the cotton-seed cake and the oil will be pure and sweet.

Heretofore cotton-seed, cotton-seed kernels, and cotton-seed oil-cake and meal have been sent across the sea in various forms, but always in such an exposed condition that the dampness or heat to which it is necessarily subjected during its transit causes much of it to become so damaged (though handled with the greatest care) that it is unfit for market, and is often sold at a heavy loss.

I am aware that fats have been used in potting and preserving meats; but such broad application I do not claim.

I have found this particular method specially adapted to the shipment of this article of commerce—namely, cotton-seed with its oils—and to this I confine myself.

I claim for my invention—

The process for shipping, or for preserving for shipment and other purposes, cotton-seed kernels, cotton-seed cake, and cotton-seed oil-meal by submerging the same in cotton-seed oil, substantially as described.

FELIX R. LANIER.

Witnesses:
 B. B. BARNES,
 M. B. TREZEVANT.